June 10, 1969 A. D. BERRY ET AL 3,449,525
GAIN CONTROL CIRCUIT IN A FREQUENCY DIVISION MULTIPLEX
TELECOMMUNICATIONS SYSTEM
Filed Jan. 11, 1966 Sheet 1 of 2

REGULATING CIRCUIT

INVENTORS
ALLAN DAVID BERRY
MAURICE PETER JOHNSON
JOHN RAYMOND WHITBREAD
BY Kirschstein, Kirschstein & Ottinger
ATTORNEYS

CONTROL CIRCUIT

INVENTORS
ALLAN DAVID BERRY
MAURICE PETER JOHNSON
JOHN RAYMOND WHITEREAD
BY
[signature]
ATTORNEYS

United States Patent Office 3,449,525

Patented June 10, 1969

3,449,525

GAIN CONTROL CIRCUIT IN A FREQUENCY DIVISION MULTIPLEX TELECOMMUNICATIONS SYSTEM

Allan David Berry, Maurice Peter Johnson, and John Raymond Whitbread, Coventry, England, assignors to The General Electric Company Limited, London, England, a British company Filed Jan. 11, 1966, Ser. No. 519,842
Claims priority, application Great Britain, Jan. 13, 1965, 1,521/65
Int. Cl. H04j *1/14;* H03g *1/02*
U.S. Cl. 179—15 2 Claims

ABSTRACT OF THE DISCLOSURE

In a frequency division multiplex system, the gain of a signal carrying circuit is controlled in dependence upon the amplitude of a pilot oscillation. Means is provided to maintain the circuit gain substantially constant in the event of an abnormal amplitude of pilot oscillation.

This invention relates to a gain control circuit in a frequency division multiplex telecommunications system.

In a carrier communication system, it is well known to transmit a pilot oscillation in frequency division multiplex with the required carrier signal, the pilot oscillation being rectified at the terminal station of the carrier system to provide a control signal that is utilised to control the attenuation (or gain) of a network (or other circuit) through which the carrier signal is passed for the purpose of regulating the level of that signal.

Another object of the present invention is to provide improved apparatus in which the amplitude of the carrier signal is largely unaffected by a temporary interruption of the input signal.

According to the present invention, in an electric circuit of the kind specified, an insulated gate field effect transistor which is connected so that the current between the source and drain electrodes thereof determines the output signal of the circuit has storage capacitance connected to its gate electrode and there is a path containing switch means over which is arranged to be passed to said gate electrode, during normal use of the circuit, a voltage that is dependent upon the amplitude of the input signal and means to operate said switch means to interrupt said path when the amplitude of the input signal has an abnormal value, the arrangement being such that, during normal use, the amplitude of the output signal is determined by the amplitude of the input signal but, when the input signal has an abnormal value, the amplitude of the output signal is determined by the voltage across the storage capacitance immediately prior to operation of the switch means as aforesaid.

The insulated gate field effect transistor is preferably a transistor of the metal-oxide-semiconductor type. Such a transistor is hereinafter referred to as a "M.O.S. transistor."

A circuit in accordance with the invention may be provided in apparatus for use in a telecommunication system for regulating a carrier signal, the input signal of the circuit being direct current derived from a pilot oscillation associated with the carrier signal and the output signal being utilised to control the attenuation or gain of a network or other circuit through which the carrier signal is passed.

Figure 1:
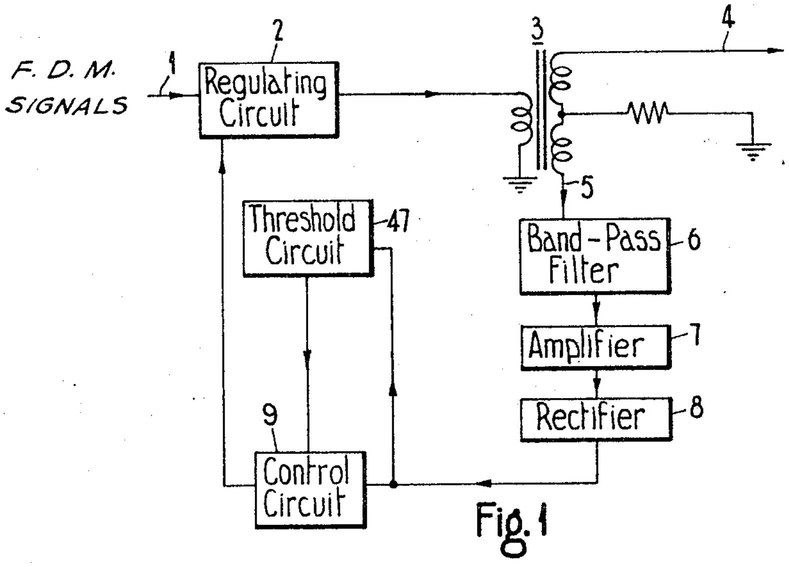
Figure 2:
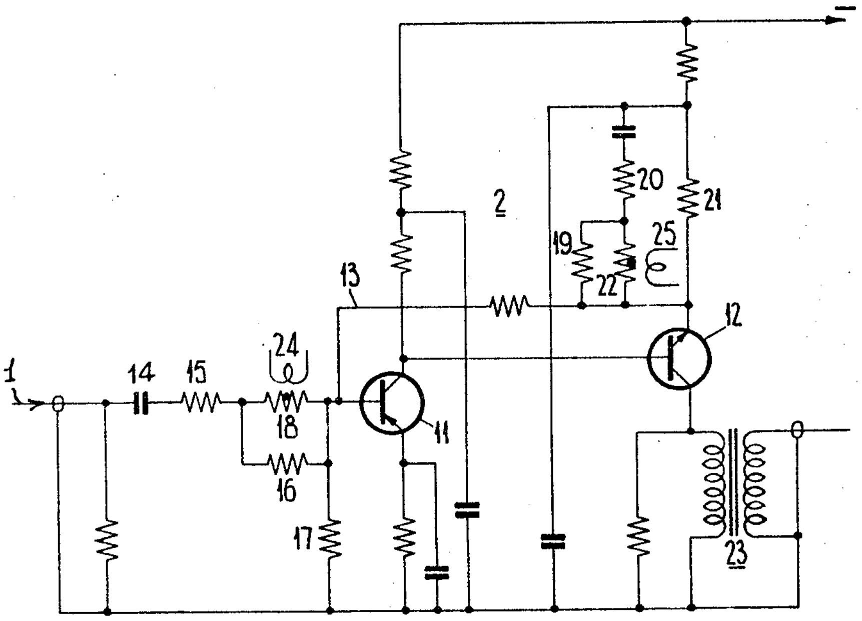
Figure 3:
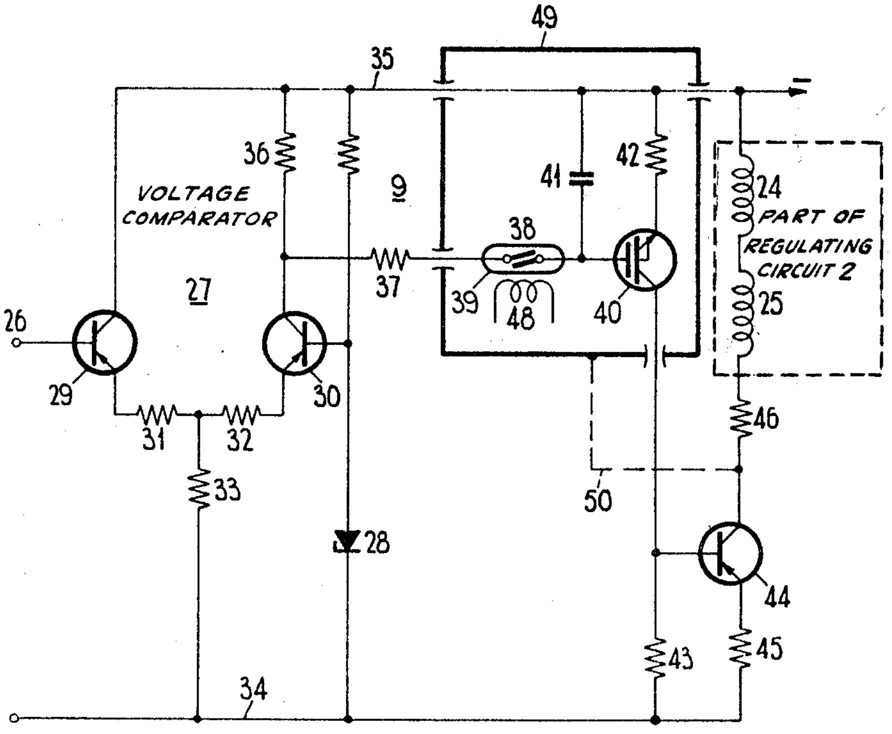

One example of apparatus for regulating a carrier telephony signal and incorporating a circuit in accordance with the invention will now be described with reference to the accompanying drawings in which FIGURE 1 shows the complete apparatus diagrammatically, and FIGURES 2 and 3 show in more detail the circuits of two parts of the apparatus.

The signal that the apparatus to be described is arranged to regulate consists, in known manner, of F.D.M. (frequency division multiplex) signals, that is, of a carrier telephony component which has information in respect of plurality of telephone channels combined in frequency division multiplex in a band of frequencies and a pilot oscillation having a frequency just outside said band of frequencies. Referring now to FIGURE 1 of the drawings, this signal is supplied over a path 1 to the regulating circuit 2. The signal passed by the circuit 2 is fed through a hybrid transformer 3 to an output path 4.

The transformer 3 also supplies a signal over a path 5 to a band-pass filter 6 which is adapted to pass the pilot oscillation but to reject all the carrier telephony component of the signal passed by the circuit 2. The oscillation passed by the filter 6 is fed through an amplifier 7 to a rectifier 8 which derives a direct current control signal signal that is utilised by way of a control circuit 9 to control the regulating circuit 2.

It is convenient now briefly to consider the regulating circuit 2 with reference to FIGURE 2. In fact the circuit 2 comprises two junction transistors 11 and 12 which provide two amplifier stages that are connected in cascade with negative feedback applied across the two stages by way of a lead 13. The input signal fed over the path 1 is supplied through a capacitor 14 to a potentiometer network formed by three resistors 15, 16 and 17 and an indirectly heated thermistor 18, the base electrode of the transistor 11 being connected to the junction of the resistors 16 and 17. The feedback over the path 13 is determined by the resistance of a network which is connected in the emitter electrode circuit of the transistor 12 and which comprises three resistors 19, 20 and 21 and an indirectly heated thermistor 22. The output signal of the regulating circuit 2 is taken from a transformer 23.

The heater elements 24 and 25 of the thermistors 18 and 22 are connected in series (not shown in FIGURE 2) and are energised with direct current supplied by the control circuit 9 (FIGURE 1), the resistance of each of these thermistors decreasing with increase of heater current. It will be appreciated that as the resistance of the thermistor 18, for example, decreases, so that gain of the amplifier stage including the transistor 11 increases, the values of the resistors 15 and 16 controlling the limits over which the gain of this stage may be varied.

Turning now to FIGURE 3 which shows the control circuit 9 in more detail, the direct current control signal supplied by the rectifier 8 is applied to a terminal 26 and a voltage comparator 27 is arranged to compare the voltage of this signal with a reference voltage developed across a Zener diode 28. This comparator 27 comprises two p-n-p junction transistors 29 and 30 which have a pair of like resistors 31 and 32 connected in series between the emitter electrodes thereof and another resistor 33 connected between the junction of the pair of resistors 31 and 32 and a supply line 34 which may be at earth potential. The terminal 26 is connected to the base electrode of the transistor 29 while the Zener diode 28 is connected between the supply line 34 and the base electrode of the transistor 30. The collector electrode of the transistor 29 is connected directly to a supply line 35 which is maintained at a negative voltage with respect to the supply line 34 and a resistor 36 is connected between the collector electrode of the transistor 30 and the supply line 35.

A resistor 37 and the contacts 38 of an electromagnetic relay 39, for example a dry reed relay, are connected in series between the collector electrode of the transistor 30 and the gate electrode of an M.O.S. transistor 40. A polystyrene capacitor 41 is connected between said gate electrode and the supply line 35. Two further resistors 42 and 43 are connected respectively between the source and drain electrodes of the M.O.S. transistor 40 on the one hand and the supply lines 35 and 34 on the other hand. The drain electrode of the M.O.S. transistor 40 is also connected to the base electrode of a further p-n-p junction transistor 44 which has a resistor 45 connected between its emitter electrode and the supply line 34. Another resistor 46 is connected in series with the heater elements 24 and 25 of the thermistors 18 and 22 (FIGURE 2) between the collector electrode of the transistor 44 and the supply line 35.

The control signal supplied by the rectifier 8 is also utilised by way of a threshold circuit 47 (FIGURE 1) to energise the operating winding 48 of the relay 39. Thus during normal use the relay 39 is operated so as to close the contacts 38 but upon the level of signal supplied by the rectifier 8 falling below the threshold of the circuit 47, say due to interruption of the pilot oscillation, this relay is immediately released and the contacts opened.

During normal use of the apparatus described above the voltage of the control signal applied to the terminal 26 has approximately the same value as the reference voltage developed across the Zener diode 28 and it will be appreciated therefore that any small change in the voltage of the control signal produces a relatively larger change in the voltage at the collector electrode of the transistor 30. The latter voltage is applied through the resistance-capacity network formed by the resistor 37 and the capacitor 41 to the gate electrode of the M.O.S. transistor 40. Thus the voltage value of the control signal determines the current between the source and drain electrodes of the M.O.S. transistor 40 and this current in turn determines the current through the heater elements 24 and 25 of the thermistors 18 and 22 of the regulating circuit 2.

The said resistance-capacity network preferably has a relatively long time constant, say of the order of twenty seconds.

In the event now of the pilot oscillation being interrupted, the contacts 38 of the reed relay 39 open but since there is then no resistive connection across the capacitor 41, the voltage of the gate electrode of the M.O.S. transistor remains substantially at the same value as immediately before the relay was released. The amplitude of the direct current supplied to the thermistor heater elements 24 and 25 is therefore substantially unchanged. When the pilot oscillation is restored, the relay is reoperated and normal regulation of the carrier signal is resumed.

The sealed element of the reed relay 39, the capacitor 41, the M.O.S. transistor 40 and the resistor 42 are housed in a sealed metal box 49 that is filled with dry air. This helps to reduce leakage from the capacitor 41 when the relay 39 is released. The box 49 may itself be maintained at a potential approximately equal to that of the "live" side of the capacitor 41 so as further to reduce leakage. For this purpose, a connection 50 (shown as a broken line) is provided between the box 49 and the collector electrode of the transistor 44. The operating coil 48 of the reed relay 39 may (as shown) also be disposed within the box 49 or alternatively may embrace the box; in the latter case the box must, of course, be of non-magnetic material.

Due to the high leakage resistance of the capacitor 41 and the high input resistance of the gate electrode of the transistor 40, it has been found that with the circuit of FIGURE 3 the voltage across the capacitor 41 drops less than 10% in a considerable number of hours after release of the relay 38.

It is to be understood that regulating apparatus incorporating a circuit in accordance with the present invention may be a so-called "flat" regulator (as, for example, the embodiment described above) in which case the attenuation or gain of a network or other circuit is controlled uniformly over the working range of frequencies or a "slope" regulator in which the control is frequency dependent.

We claim:

1. Apparatus for use in a telecommunication system for regulating a signal comprising an input path for an input signal which has the required intelligence and a pilot oscillation combined in frequency division multiplex, an output path, a regulating circuit connected between the input and output paths, filter means to separate the pilot oscillation from the signal supplied by the regulating circuit to the output path, means to derive from the pilot oscillation passed by the filter means a steady signal having an amplitude that is dependent upon the amplitude of the pilot oscillation, an insulated gate field effect transistor having source, drain and gate electrodes, switch means connected between said means to derive a steady signal and the gate electrode of the transistor, means responsive to the amplitude of the pilot oscillation to operate said switch means so as to complete a connection for said steady signal to be supplied to the gate electrode under normal conditions and to interrupt that connection when the amplitude of the pilot oscillation has an abnormally low value, storage capacitance connected to the gate electrode of said transistor, and means responsive to the amplitude of direct current flowing between the source and drain electrode of the transistor to supply a control signal to said regulating circuit, the arrangement being such that, when the pilot oscillation has an abnormally low amplitude and the switch means is operated to interrupt said connection, the amplitude of the control signal is determined by the voltage across the storage capacitance immediately prior to the switch means being so operated.

2. Apparatus according to claim 1 wherein said means to derive a steady signal comprises rectifier means to rectify the pilot oscillation passed by said filter means, a reference voltage source, and comparison means which is connected to both the rectifier means and the reference voltage source and which supplies said steady signal.

References Cited

UNITED STATES PATENTS

| | | | |
|---|---|---|---|
| 2,757,239 | 7/1956 | Patton | 179—15 |
| 3,182,137 | 5/1965 | Beatty | 325—62 |
| 2,965,717 | 12/1960 | Bell | 325—62 |

ROBERT L. GRIFFIN, *Primary Examiner.*

CARL R. VON HELLENS, *Assistant Examiner.*

U.S. Cl. X.R.

307—235; 325—62